United States Patent
Yasuda

(10) Patent No.: US 10,943,331 B2
(45) Date of Patent: Mar. 9, 2021

(54) IMAGE PROCESSING METHOD AND IMAGE PROCESSING APPARATUS

(71) Applicant: SCREEN HOLDINGS CO., LTD., Kyoto (JP)

(72) Inventor: Takuya Yasuda, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 93 days.

(21) Appl. No.: 16/531,943

(22) Filed: Aug. 5, 2019

(65) Prior Publication Data
US 2020/0098094 A1   Mar. 26, 2020

(30) Foreign Application Priority Data

Sep. 25, 2018 (JP) .............................. JP2018-178678

(51) Int. Cl.
*G06T 7/60* (2017.01)
*G06T 5/50* (2006.01)
*G06T 5/00* (2006.01)

(52) U.S. Cl.
CPC ............... *G06T 5/003* (2013.01); *G06T 5/50* (2013.01); *G06T 7/60* (2013.01); *G06T 2207/10056* (2013.01); *G06T 2207/20172* (2013.01)

(58) Field of Classification Search
CPC .......... G06T 5/003; G06T 5/50; G06T 5/006; G06T 7/60; G06T 2207/10056;

(Continued)

(56) References Cited

U.S. PATENT DOCUMENTS 9,055,218 B2 * 6/2015 Nishiyama ......... H04N 5/23229
2013/0342753 A1 * 12/2013 Kitagawa ......... H04N 5/232133
348/349

(Continued)

FOREIGN PATENT DOCUMENTS

CN   106154502 A   11/2016
CN   107290847 A   10/2017
(Continued)

OTHER PUBLICATIONS

Chinese Office Action issued in corresponding Chinese Patent Application No. 201910752405.3, dated Oct. 21, 2020, with English translation.

*Primary Examiner* — Edward F Urban
*Assistant Examiner* — Wassim Mahrouka
(74) *Attorney, Agent, or Firm* — McDermott Will & Emery LLP

(57) ABSTRACT

An object of the invention is to provide an image processing technique for generating an all-in-focus image with less distortion from images obtained by imaging an imaging object carried together with a liquid in a well at different focus positions. An image processing method of the invention includes obtaining a plurality of images captured by imaging an imaging object carried together with a liquid in a well with a focus position changed in a direction substantially perpendicular to a liquid surface, calculating a local movement amount between the plurality of images, determining a correlation between a distance from a center of the well and an image distortion amount based on the local movement amount, and synthesizing the plurality of images by correcting pixels in each image based on the correlation and generating an all-in-focus image.

11 Claims, 10 Drawing Sheets

(58) Field of Classification Search
CPC . G06T 2207/20172; G06T 2207/30072; G06T 2207/30024; G06T 2207/20221; G06T 2207/10148; G02B 21/365; G02B 7/38; H04N 5/23229; H04N 5/217; G01N 21/84

See application file for complete search history.

(56) References Cited

U.S. PATENT DOCUMENTS

| | | | |
|---|---|---|---|
| 2017/0295312 A1 | 10/2017 | Takahashi | |
| 2018/0007253 A1* | 1/2018 | Abe | H04N 5/232122 |
| 2018/0113294 A1* | 4/2018 | Shiraishi | G03B 15/03 |
| 2020/0013146 A1* | 1/2020 | Yasuda | G06T 5/50 |

FOREIGN PATENT DOCUMENTS

| | | |
|---|---|---|
| EP | 3 487 163 A1 | 5/2019 |
| JP | 2018-010104 A | 1/2018 |
| JP | 2018-042006 A | 3/2018 |
| JP | 2018-046475 A | 3/2018 |

\* cited by examiner

IMAGE PROCESSING METHOD AND IMAGE PROCESSING APPARATUS

CROSS REFERENCE TO RELATED APPLICATION

The disclosure of Japanese Patent Application No. 2018-178678 filed on Sep. 25, 2018 including specification, drawings and claims is incorporated herein by reference in its entirety.

BACKGROUND OF THE INVENTION

1. Field of the Invention

This invention relates to an image processing technique for generating an all-in-focus image from images obtained by imaging an imaging object carried together with a liquid in a well at different focus positions.

2. Description of the Related Art

In the culturing and analysis of cells, images obtained by imaging a specimen including the cells may be used. The specimen is prepared using a flat plate-like container provided with a plurality of wells (recesses) called a well plate or a microplate or a flat dish-like container called a dish including a single well. The cells as an imaging object are held together with a culture liquid in the well. In recording such a specimen including the cells as an image, the cells may be distributed at various depths in the liquid. Therefore, imaging is performed a plurality of number of times while a focus position in a depth direction is changed, and an all-in-focus image is generated by synthesizing a plurality of obtained images.

For example, a technique described in JP 2018-010104A (patent literature 1) previously disclosed by the applicant of this application is a technique for generating an all-in-focus image from a plurality of images imaged while a focus position was changed. This technique has a configuration for dealing with a problem that a magnification of an image changes as the focus position changes due to a lens effect by the meniscus of the liquid surface of a culture liquid. Specifically, a magnification variation amount and a parallel movement amount are obtained from the sizes and positions of the cells between the images having different focus positions, and images are corrected based on these amounts and synthesized to generate an all-in-focus image.

A distortion of an image caused by the meniscus of the liquid surface is not necessarily uniform in the image. Specifically, the distortion is small in a central part of the well and becomes suddenly larger toward a peripheral edge. The difference is particularly prominent in a well having a large diameter. Besides this, distortions due to an imaging optical system and illumination may be included in an image, and these may locally appear in the well. With a method for applying a uniform correction in the entire well, it may be difficult to sufficiently deal with such distortions of the image.

SUMMARY OF THE INVENTION

This invention was developed in view of the above problem and an object thereof is to provide an image processing technique for generating an all-in-focus image with less distortion from images obtained by imaging an imaging object carried together with a liquid in a well at different focus positions.

To achieve the above object, one aspect of this invention is directed to an image processing method including obtaining a plurality of images captured by imaging an imaging object carried together with a liquid in a well with a focus position changed in a direction substantially perpendicular to a liquid surface, calculating a local movement amount between the plurality of images, determining a correlation between a distance from a center of the well and an image distortion amount based on the local movement amount, and synthesizing the plurality of images by correcting pixels in each image based on the correlation and generating an all-in-focus image.

Further, to achieve the above object, another aspect of this invention is directed to an image processing apparatus including an imager which captures a plurality of images by imaging an imaging object carried together with a liquid in a well with a focus position changed in a direction substantially perpendicular to a liquid surface, and an image processor which generates an all-in-focus image by synthesizing the plurality of images, the image processor determining a correlation between a distance from a center of the well and an image distortion amount based on a local movement amount calculated between the plurality of images and synthesizing the plurality of images by correcting pixels in each image based on the correlation.

In the invention thus configured, the correlation between the distance from the well center and the image distortion amount is determined based on the local movement amount calculated between the images imaged at the focus positions different from each other. In synthesizing the images, the pixels in each image are corrected based on the obtained correlation. Thus, each pixel is corrected according to the distance from the well center. Therefore, even if a magnitude of distortion changes from a well central part toward a peripheral edge part, a correction corresponding to the amount of the generated distortion is applied, whereby the correction in each part can be made proper.

As described above, according to the invention, each pixel in an image to be processed is corrected according to a distance from a well center and based on a local movement amount detected between actually imaged images. Thus, a distortion nonuniformly created in the well due to meniscus and other factors can be appropriately corrected. By applying such a correction in generating an all-in-focus image, the all-in-focus image with satisfactory image quality can be generated.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

DETAILED DESCRIPTION OF THE PREFERRED EMBODIMENT

Hereinafter, a preferred embodiment of the invention is described with reference to the drawings. In the following description, an "image processing apparatus" of the invention is an imaging apparatus for imaging a well plate. It is described that an "image processing method" of the invention is executed in the imaging apparatus.

Figure 1A:
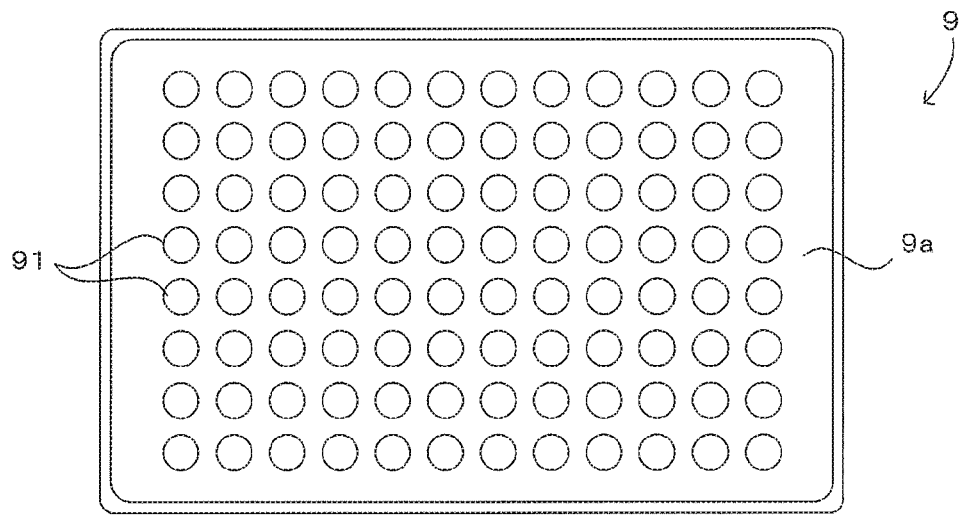
FIGS. 1A and 1B are diagrams showing an example of a well plate used in the invention.
Figure 1B:
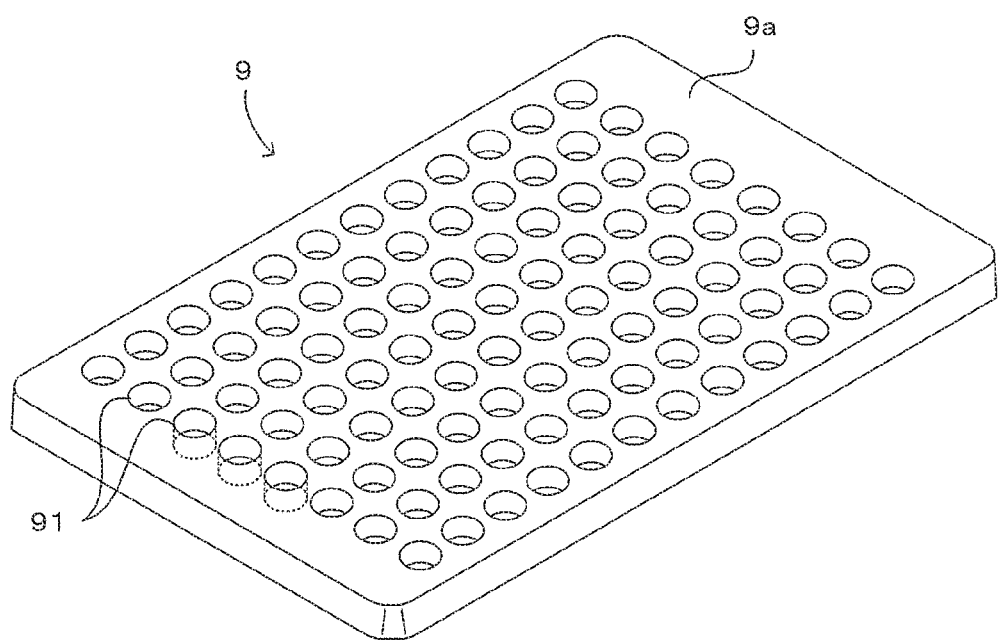

FIGS. 1A and 1B are diagrams showing an example of a well plate used in the invention. Specifically, FIG. 1A is a top view of a well plate 9 and FIG. 1B is a perspective view of the well plate 9. The well plate 9 is a substantially plate-like specimen container including a plurality of wells 91. A transparent resin which transmits visible light is, for example, used as a material of the well plate 9. The plurality of wells 91 are regularly arranged in the upper surface of the well plate 9. The wells 91 hold a plurality of cells serving as an imaging object together with a culture medium. In this embodiment, the wells 91 are described to have a circular shape in a top view. However, the wells 91 may have another shape such as a rectangular shape or a rounded rectangular shape.

Figure 2:
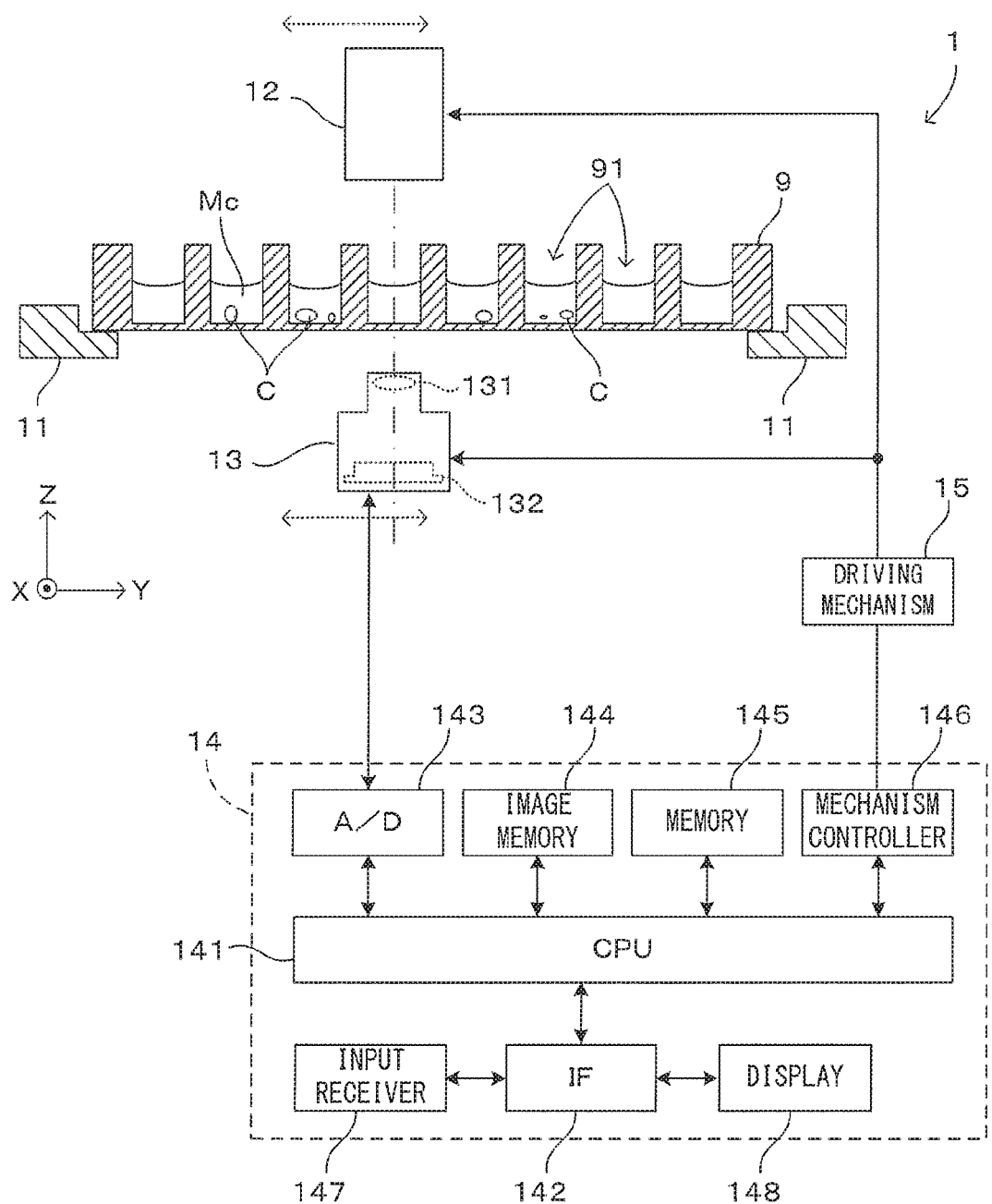
FIG. 2 is a diagram showing a schematic configuration of the imaging apparatus in this embodiment.

FIG. 2 is a diagram showing a schematic configuration of the imaging apparatus in this embodiment. This imaging apparatus 1 is an apparatus for imaging a living specimen such as cells, cell colonies and bacteria (hereinafter, referred to as "cells and the like" and denoted by C) cultured in the culture medium carried in recesses called the wells 91 formed in the upper surface of the well plate 9. Note that the size of the well plate and the number of the wells to be imaged by this imaging apparatus 1 are not limited to these and are arbitrary. For example, well plates having 6 to 384 holes are generally used. Further, this imaging apparatus 1 can be used also in imaging cells and the like cultured, for example, in a flat container called a dish without being limited to use for well plates including a plurality of wells. Here, an XYZ orthogonal coordinate system as shown in FIG. 2 is set to uniformly indicate directions in each figure. For example, an XY plane can be considered as a horizontal plane and a Z axis can be considered as a vertical axis. In the following description, a (−Z) direction is assumed as a vertically downward direction.

A predetermined amount of a liquid serving as a culture medium Mc is injected into each well 91 of the well plate 9, and the cells and the like C cultured under predetermined culture conditions in this liquid become an imaging object of this imaging apparatus 1. The culture medium may be added with an appropriate reagent or may be gelled after being injected in a liquid state into the wells 91. In this imaging apparatus 1, for example, cells and the like C cultured, on the inner bottom surfaces of the wells 91 can be imaged.

The imaging apparatus 1 includes a holder 11 which holds the well plate 9, an illuminator 12 arranged above the holder 11, an imager 13 arranged below the holder 11 and a controller 14 which includes a CPU 141 controlling the operation of these components. The holder 11 holds the well plate 9 in a substantially horizontal posture by being held in contact with a peripheral edge part of the lower surface of the well plate 9 carrying sample together with liquid in each well 91.

The illuminator 12 emits an illumination light toward the well plate 9 held by the holder 11. For example, a white LED (light emitting diode) may be used as a light source of the illumination light. A combination of the light source and an appropriate illumination optical system are used as the illuminator 12. The cells or the like in the well 91 disposed to the well plate 9 are illuminated by the illuminator 12 from above.

The imager 13 is provided below the well plate 9 held by the holder 11. In the imager 13, an imaging optical system is arranged at a position right below the well plate 9. An optical axis of the imaging optical system extends in a vertical direction. FIG. 2 shows a side view. A right and left direction of the figure indicates a horizontal direction and an up and down direction of the figure indicates a vertical direction.

The imaging of the cells or the like in the well 91 is performed by the imager 13. Specifically, light emitted from the illuminator 12 and incident on the surface of the liquid from above the well 91 illuminates the imaging object. Light transmitted downward from the bottom surface of the well 91 is incident to a light receiving surface of an imaging element 132 via the imaging optical system of the imager 13 including an objective lens 131. An image of the imaging object formed on the light receiving surface of the imaging element 132 by the imaging optical system is imaged by the imaging element 132. The imaging element 132 is an area image sensor having a two-dimensional light receiving surface. A CCD sensor or a CMOS sensor can be used as the imaging element 132.

The imager 13 is capable of moving in the horizontal direction and the vertical direction by a mechanism controller 146 provided in the controller 14. Specifically, the mechanism controller 146 moves the imager 13 in the horizontal direction by operating a drive mechanism 15 based on a control command from the CPU 141. By doing so, the imager 13 moves relative to the well 91 in the horizontal direction. Further, focusing is performed by moving the imager 13 in the vertical direction. When the imaging is performed in a state that a whole of the well 91 is included in a field of view, the mechanism controller 146 positions the imager 13 in the horizontal direction such that the optical axis of the imaging optical system coincides with the center of the well 91.

Further, the as indicated by arrows with dotted lines shown in FIG. 2, the driving mechanism 15 moves the illuminator 12 integrally with the imager 13 when the imager 13 is moved in the horizontal direction. Specifically, the illuminator 12 is arranged such that a center of emitted light substantially coincides with the optical axis of the imaging optical system. When the imager 13 moves in the horizontal direction, the illuminator 12 also moves in conjunction with the imager 13. By doing so, whichever well 91 is imaged, the center of the well W and the center of emitted light are always position on the optical axis of the imaging optical system. Consequently, the illuminating condition becomes constant regardless of which well 91 is to be imaged, wherefore imaging conditions can be maintained to be satisfactory.

The image signal output from the imaging element 132 of the imager 13 is send to the controller 14. The image signal is input to an AD converter (A/D) 143 provided in the controller 14 and converted into digital image data. The CPU 141 functions as an image processor which performs appropriate image processings based on the received image data. The controller 14 further includes an image memory 144 for storing image data and a memory 145 for storing programs to be executed by the CPU 141 and data generated by the CPU 141, but these may be integrated. The CPU 141 performs variable calculation processings described later by executing a control program stored in the memory 145.

Besides, the controller 14 is provided with an interface (I/F) 142. The interface 142 has a function of receiving an operation input from a user and presenting information such as processing results to the user. The controller 14 also has a function of performing data exchange with an external apparatus connected via a communication line. To realize the user interface function, an input receiver 147 for receiving an operation input from the user and a display 148 for displaying the messages to the user, a processing result or the like are connected to the interface 142.

Note that the controller 14 may be an exclusive device including above hardware. Further, the controller 14 may be a general-purpose processing device such as a personal computer or a workstation installed with the control program for performing the process described later. Specifically, a general-purpose computer apparatus may be used as the controller 14 of the imaging apparatus 1. When a general-purpose processing device is used as the controller 14, the imaging apparatus 1 may have just a minimal control function for controlling each components of the imager 13 and the like.

Figure 3:
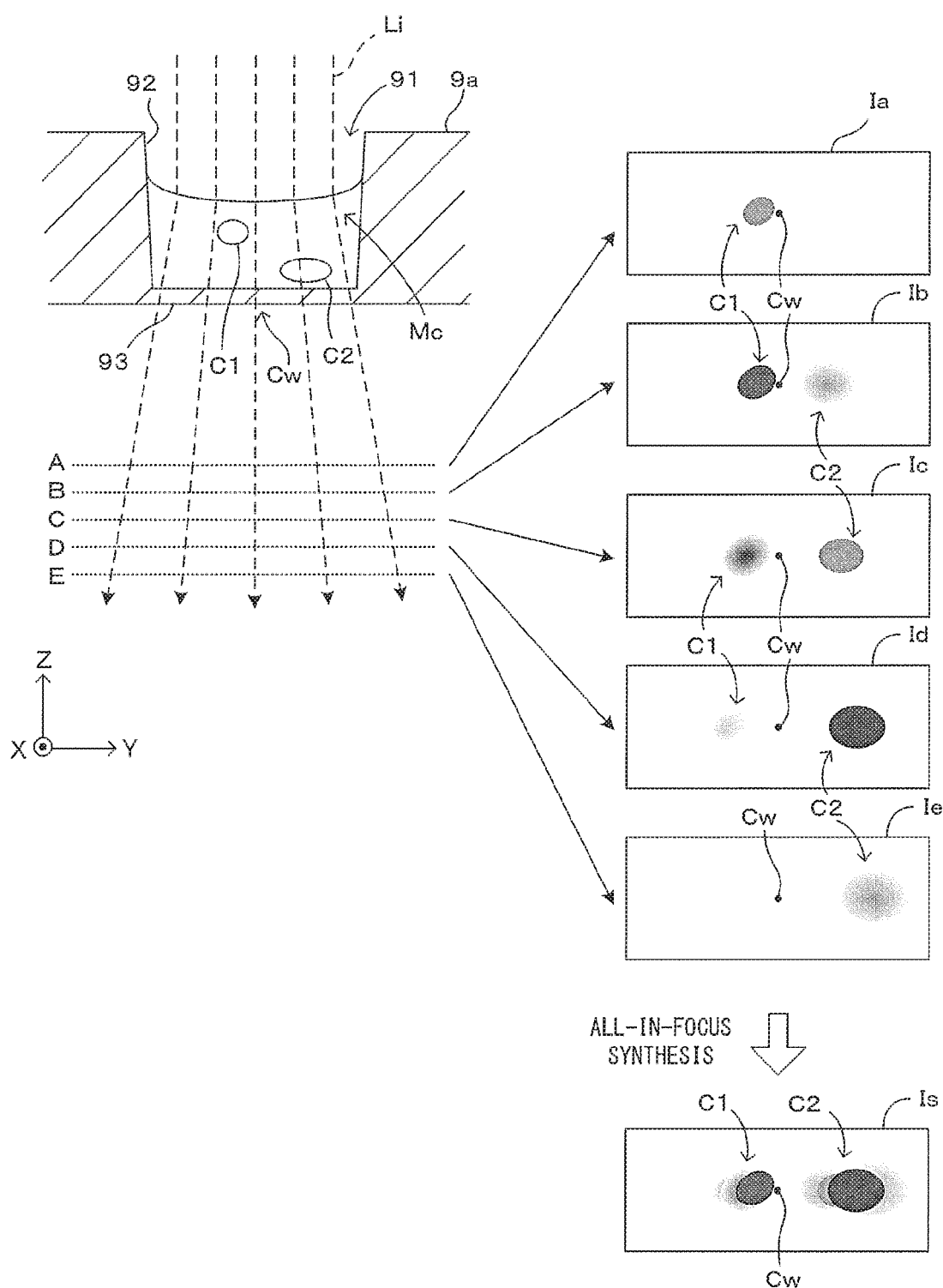
FIG. 3 is a diagram showing a problem in imaging.

FIG. 3 is a diagram showing a problem in imaging. More specifically, FIG. 3 shows a side cross-section of the well 91 in a state carrying the culture medium M. As shown in FIG. 3, a side wall surface 92 of the well 91 is a cylindrical surface or tapered to gradually reduce a cross-sectional area from an upper part toward a bottom part. The culture medium Mc is injected into the well 91, and cell colonies C1, C2 are carried inside the well 91. The cell colonies C1, C2 can be present at arbitrary depths between the liquid surface of the culture medium Mc and a well bottom surface 93. Here, the cell colony C1 is assumed here to be present near a well center Cw in a horizontal direction and in an upper part near the liquid surface in a vertical direction. On the other hand, the cell colony C2 is assumed to be present at a position near the well side wall surface 92 and the well bottom surface 93.

In a part where the culture medium Mc injected into the well 91 is in contact with the well side wall surface 92, the liquid surface is raised due to meniscus. Specifically, the liquid surface of the culture medium Mc is substantially horizontal in a well central part, but is raised toward the well side wall surface 92 to form a curved surface convex downward. Thus, when light Li is incident on the liquid surface from an illumination unit 12, a propagation path of the light Li is bent by refraction on the liquid surface. In more detail, light incident on the vicinity of a center (well center) Cw of the well bottom surface 93 propagates substantially straight, but light incident on a more outward part is bent in a direction extending from the well center Cw toward an outer side. Specifically, the liquid surface functions as a concave lens.

Here, a case is considered where imaging is performed with an objective lens 131 of an imaging unit 13 located at each position A to E indicated by dotted lines. When the objective lens 131 is positioned at an uppermost position A, i.e. the position closest to the well bottom surface 93, a focus position of the objective lens 131 in an optical axis direction (Z direction) is also uppermost. An image Ia imaged in this state includes an image of the cell colony C1 located at the position near the liquid surface. If the objective lens 131 is moved away to the position B to move the focus position downward by one stage, the image of the cell colony C1 is clearest as shown as an image Ib. If the objective lens 131 is further moved away and imaging is performed successively with the objective lens 131 located at the positions C to E, the cell colony C1 is gradually moved away from the focus position and the image becomes gradually unclear as shown as images Ic to Ie.

On the other hand, the cell colony C2 present at a deeper position hardly appears in the image Ia obtained at the focus position set to be uppermost, and becomes clearest in the image Id imaged at the deeper position D. In the images imaged at the positions shallower or deeper than this position, the cell colony C2 becomes gradually unclear with distance from the focus position.

At this time, the light Li spreads more toward a lower side as shown by broken lines in FIG. 3 by the lens action of the meniscus. Hence, the images of the cell colonies C1, C2 not only change in clearness, but also are displaced in a direction away from the well center Cw as the focus position moves downward. Displacement amounts are relatively small in the images of the cell colony C1 near the well center Cw, but displacements are larger in the images of the cell colony C2 more distant from the well center Cw. If these images are used as they are and synthesized to generate an all-in-focus image Is, ghost-like shadows and image distortions are created around the cell colonies C1, C2, which is not preferable in terms of image quality.

In an image processing of this embodiment to be described later, a correction process is performed to solve this problem. Specific contents of the image processing of this embodiment including the correction process are described below. First, the principle of the correction process is described with reference to FIGS. 4A to 4C and 5.

Figure 4A:
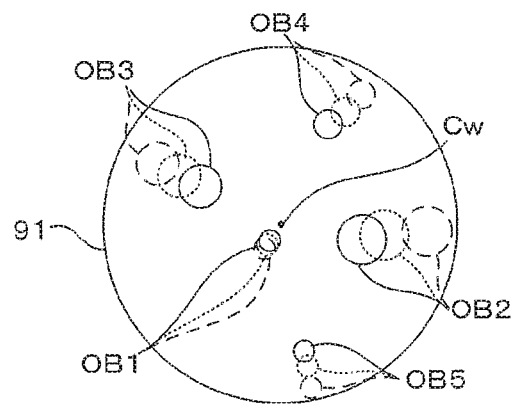
FIGS. 4A to 4C are diagrams and a graph showing a method for quantitatively representing displacements.
Figure 4B:
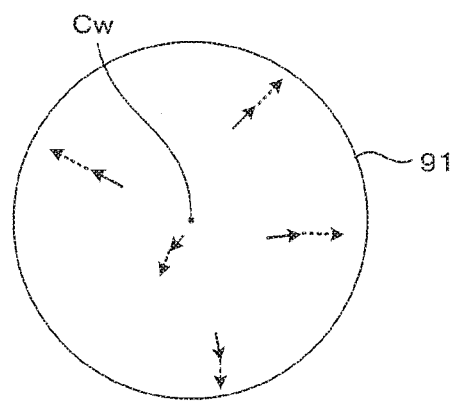
Figure 4C:
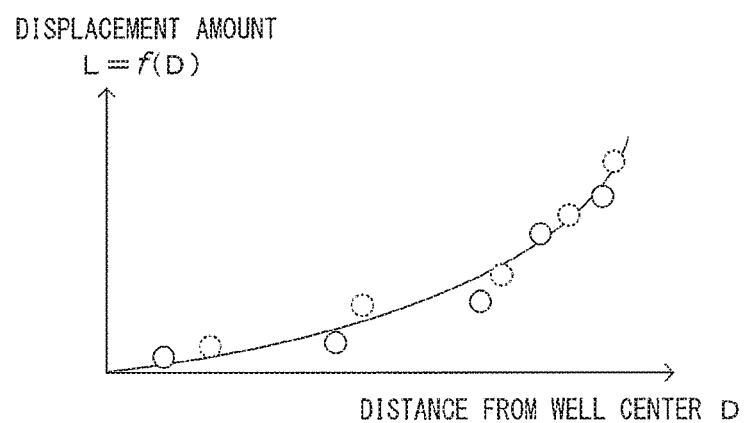

FIGS. 4A to 4C are diagrams and a graph showing a method for quantitatively representing displacements. FIG. 4A is a diagram schematically showing displacements of image objects according to a change of the focus position. More specifically, FIG. 4A shows an example of an image of the well 91 when three images having different focus positions during imaging are virtually superimposed. Objects OB1 to OB5 shown by solid lines in FIG. 4A indicate positions when imaging was performed with the focus position set to be relatively above. Dotted lines indicate positions of the objects OB1 to OB5 when imaging was performed with the focus position set to be lower and broken lines indicate positions of the objects when imaging was performed with the focus position set to be even lower.

According to the lens effect of the meniscus, the objects OB1 to OB5 are substantially displaced in directions away from the well center Cw by lowering the focus position as shown in FIG. 4A. The displacement amounts are relatively small for the objects located at positions near the well center Cw, and larger for the objects located at more distant positions. In FIG. 4A, the respective objects are denoted by OB1, OB2, . . . successively from the one closest to the well center Cw.

FIG. 4B shows the displacements of the respective objects by motion vectors. Here, a solid-line arrow indicates a motion of each object between the image obtained at a first position as the uppermost focus position, and the image at a subsequent second position. A dotted-line arrow indicates a motion of the object between the image imaged at the second position as the focus position, and the image at a third position as the lowermost focus position. FIG. 4B quantitatively shows the displacements of the images. In other words, a magnitude and a direction of the displacement at each position in the image are represented by the motion vector. Each motion vector is substantially an outward vector from the well center Cw and a magnitude thereof becomes larger with distance from the well center Cw.

In image distortion due to the meniscus, a direction of displacement can be assumed to be a radial direction of a pixel when the well center Cw is an origin, i.e. a direction away from the well center Cw along a straight line connecting the well center Cw and the pixel. Further, magnitudes of displacements of pixels can be assumed to be substantially equal regardless of the positions in the image if distances from the well center Cw are equal. Thinking in this way, it is no longer necessary to consider the directions of the motion vectors described above and the displacements can be expressed only by scalar quantities representing the magnitudes of the motion vectors.

For example, paying attention to pixels corresponding to a characteristic part in an image such as a center of gravity of an object, magnitudes (displacement amounts) L of the pixels are plotted along a vertical axis with distances D of the pixels from the well center Cw represented on a horizontal axis as shown in FIG. 4C. Then, such a relationship that the displacement amount L also increases as the distance D increases is obtained. Out of the respective plot points of FIG. 4C, a solid-line circle represents an example of the displacement amount between the image having the focus position at the first position and the image having the focus position at the second position. A dotted-line circle represents an example of the displacement amount between the image having the focus position at the second position and the image having the focus position at the third position. A relationship between the distance D and the displacement amount L expressed by these plot points indicates a correlation between the distance D of the position from the well center Cw and an image distortion amount for the pixel at each position in the image.

This correlation can be approximated by an appropriate polynomial $L=f(D)$. In other words, if such an approximation curve is specified, how much each pixel in the image is displaced can be estimated. If each pixel is moved to cancel out such a displacement, a distortion due to the meniscus can be corrected. The displacement amount L can be obtained, for example, as a local movement amount of a characteristic point in the image. Further, the local movement amounts can be obtained, by dividing the image into a mesh, as relative movement amounts between images in respective divided areas.

Figure 5:
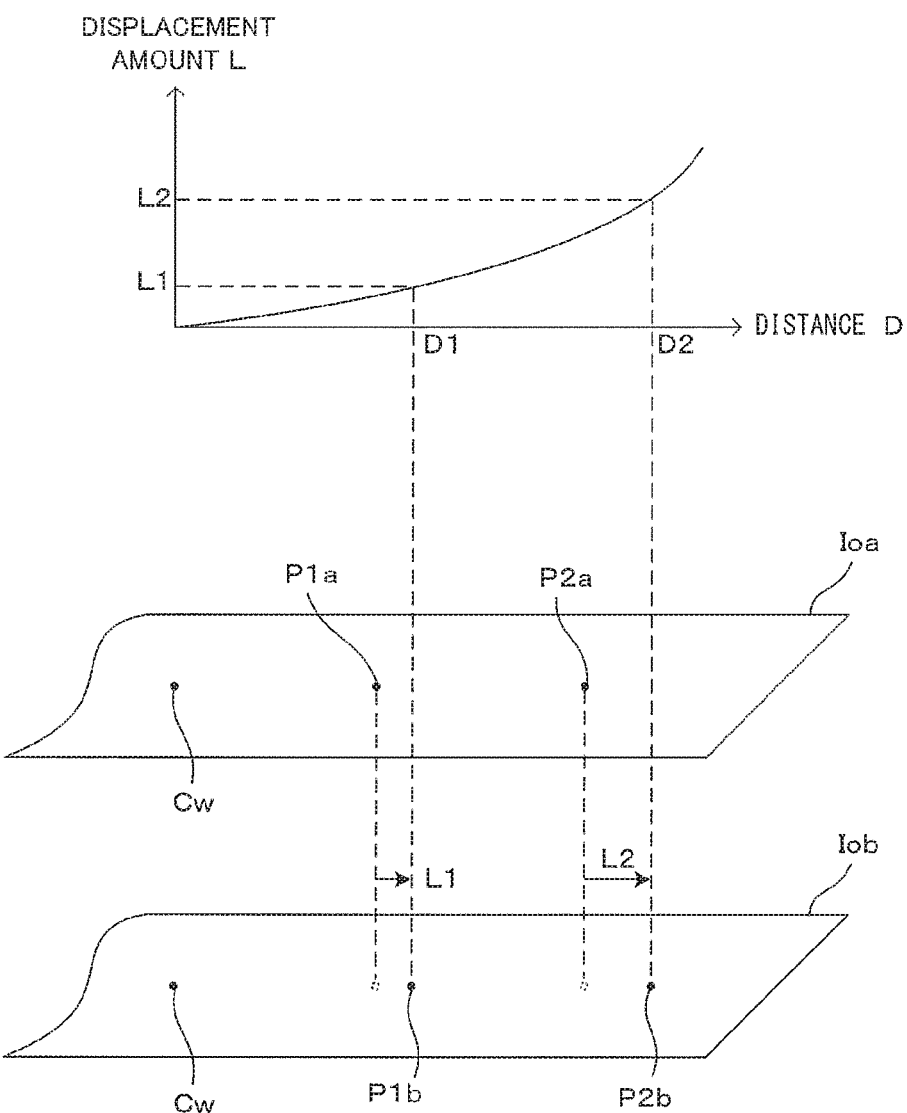
FIG. 5 is a graph showing the principle of the correction process of this embodiment.

FIG. 5 is a graph showing the principle of the correction process of this embodiment. Pixels corresponding to each other between an original image Ioa imaged at a certain focus position and an original image Iob imaged at a focus position lower than the former focus position by one stage are considered. A point P1$b$ on the image Iob corresponding to a point P1$a$ on the image Ioa appears at a position distant from the well center Cw by a displace L1 in the image because of a distortion of the image due to the meniscus. Further, a point P2$b$ on the image Iob corresponding to a point P2$a$ on the image Ioa appears at a position distant from the well center Cw by a distance L2 in the image. If the images Ioa and Iob are synthesized as they are without considering the influence of distortions, the images of a same object appear at different positions due to the displacements included in the respective images. This positional deviation reduces the quality of the synthesized image.

In the case of generating an all-in-focus image by synthesizing the images Ioa and Iob, each pixel in the all-in-focus image is determined based on the comparison of the pixels at corresponding positions. Specifically, the information of the pixel close to a focused state with respect to an imaging object and clear, out of the pixels to be compared, is more strongly reflected on the pixel in the all-in-focus image. At this time, between the images Ioa and Iob, not the pixels at the same position, but the pixel at the point P1$a$ and the pixel at the point P1$b$ need to be treated as the pixels corresponding to each other for the above reason. Similarly, the pixel at the point P2$a$ and the pixel at the point P2$b$ need to be treated as the pixels corresponding to each other.

To enable this, the point P1$b$ on the image Iob may be compared to the point P1$a$ on the image Ioa while being moved the distance L1 in a direction toward the well center Cw on the image Iob. Further, the point P2$b$ may be compared to the point P2$a$ on the image Ioa while being moved the distance L2 in a direction toward the well center Cw on the image Iob. As just described, the displacement amount L expressed as a function of the distance D from the well center Cw represents a correction amount at the position of each pixel of the image bob necessary for the correspondence of the images Iob and Ioa.

As just described, in generating an all-in-focus image by synthesizing two images having different focus positions during imaging, distortions of the images are corrected based on a correlation between the distance D from the well center Cw specified by the local movement amount obtained from the images and the distortion amount L of the pixel at that position. Even if there are three or more images having different focus positions, pixels corresponding to each other among all the images can be specified if a correspondence relationship of pixels between two images having focus positions different by one stage is clarified. By determining the pixels of the all-in-focus image from the information of those pixels, it is possible to avoid the image quality deterioration of the all-in-focus image because of the distortions of the images due to the meniscus. If this correction is applied to individual images, it is possible to obtain each image in which a shape change of an object and a positional deviation due to the meniscus are solved.

The operation of the imaging apparatus 1 according to this embodiment is described below. This imaging apparatus 1 performs an imaging operation shown in FIG. 6 and an image processing operation shown in FIG. 7. These operations are realized by the CPU 141 provided in the controller 14 executing a control program implemented in advance to cause each component of the apparatus to perform a predetermined operation.

Figure 6:
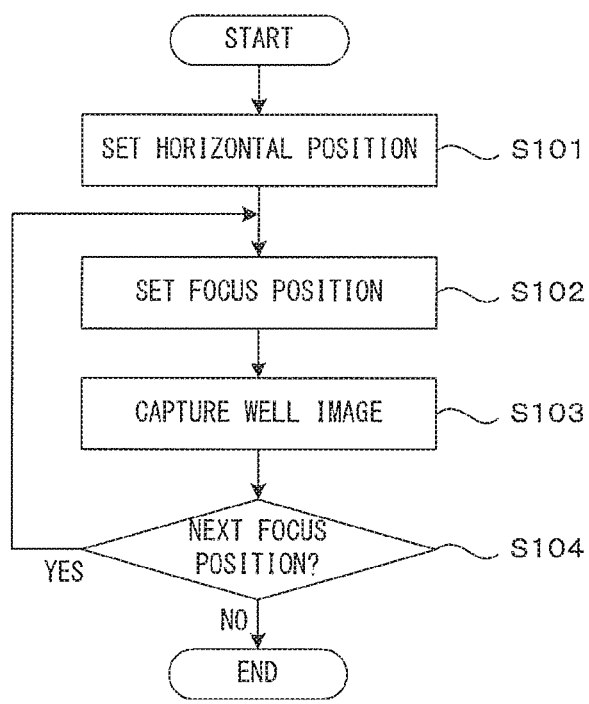
FIG. 6 is a flow chart showing the imaging operation of this embodiment.

FIG. 6 is a flow chart showing the imaging operation of this embodiment. First, a driving mechanism 15 drives the imager 13 to set the horizontal position of the imager 13 so that the well 91 serving as the imaging object is captured in a field of view (Step S101) and position the imager 13 in the vertical direction so that the focus position of the objective lens 131 reaches a predetermined initial position (Step S102). In this state, the well 91 is imaged (Step S103). Return is made to Step S102 and imaging is performed after the imager 13 is positioned at a new focus position if there is any focus position to be set next (YES in Step S104). The above operation is repeated until imaging at each focus position is finished (No in Step S104), whereby a plurality of images whose focus positions are changed in multiple stages in the optical axis direction of the imager 13 are obtained. Note that a change pitch of the focus position per stage is constant.

Figure 7:
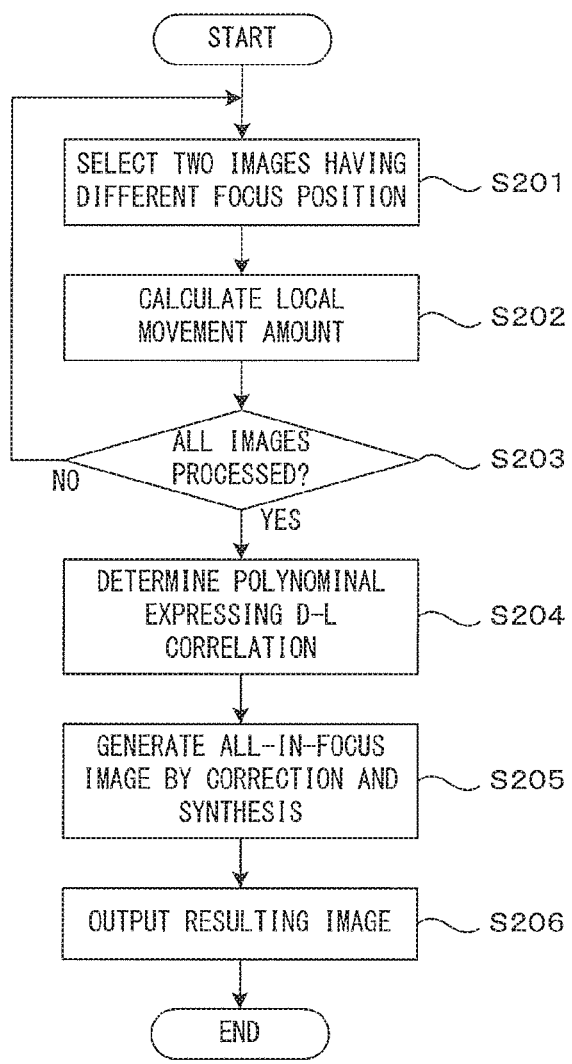
FIG. 7 is a flow chart showing the image processing of this embodiment.

FIG. 7 is a flow chart showing the image processing of this embodiment. This imaging operation is a process of generating an all-in-focus image by synthesizing a plurality of images obtained as described above. First, two images whose focus positions are different by one stage are selected (Step S201), and a relative local movement amount is obtained for at least one location, more preferably for each of a plurality of locations corresponding to each other between these images (Step S202). An algorithm or function for calculating the local movement amount is a known one standardly implemented also in general-purpose image processing software (e.g. optical flow method), and can be also utilized in this embodiment. Thus, no detailed description is given here. This operation is performed for all combinations of images whose focus positions are different by one stage (Step S203).

Since the local movement amount is obtained between the images whose focus positions are different by one stage, a probability that the same object in a specimen appears in the both images is relatively high. Thus, there are many locations corresponding between the images, wherefore the number of samples of the local movement amount can be increased. This contributes to an accuracy improvement of polynomial approximation.

Note that a direction of displacement of an object appearing in an image may not be a radial direction from the well center Cw as an origin. If there are also distortion factors other than the meniscus such as a distortion of the imaging optical system, uneven illumination, the unevenness of the liquid surface of the culture medium Mc, the displacement direction of the object may deviate from the radial direction. In this case, two methods for obtaining a local movement amount serving as a scalar quantity are considered.

Figure 8:
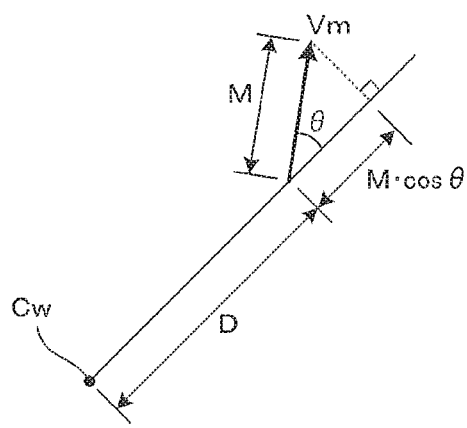
FIG. 8 is a diagram showing how to obtain a local movement amount when a displacement direction and a radial direction do not match.

FIG. 8 is a diagram showing how to obtain a local movement amount when a displacement direction and a radial direction do not match. It is assumed that an object whose displacement is expressed by a motion vector Vm is present at a position separated from a well center Cw by a distance D. At this time, an angle $\theta$ of the motion vector Vm with respect to the radial direction is not necessarily 0. According to the knowledge of the inventors of this application, unless this angle $\theta$ is extremely large, there is no large difference in a distortion correction effect even if a magnitude M of the motion vector Vm is directly used as a magnitude of the local movement amount or a magnitude M $\cos \theta$ of a radial component of the motion vector Vm is used as the local movement amount. One reason of this is thought that a direction variation is canceled out by using local movement amounts of a multitude of characteristic points detected at various azimuths around the well center Cw in the above method.

Further, irregular displacements may be possibly detected due to movements of the cells themselves during imaging. Since such displacements become an error factor, it is desirable to eliminate such displacements from the process. For example, an upper limit value (e.g. 45° or 90°) may be set for the above angle $\theta$ and displacements exceeding this upper limit value may be excluded from calculation. Further, displacements detected outside the contour of the well 91 are also preferably excluded from calculation.

Referring back to FIG. 7, by collecting pairs of the distance D from the well center Cw and the displacement amount L for a plurality of locations extracted from the images, an approximation polynomial expressing a correlation of these is determined (Step S204). A known least squares method can be, for example, applied to specify a polynomial. Note that the pairs of the distance D from the well center Cw and the displacement amount L applied to the specification of the polynomial are not distinguished as to between which two images those were obtained. Specifically, one polynomial is obtained from all the pairs. The thus obtained relationship between the distance D from the well center Cw and the displacement amount L expresses a magnitude of a relative image distortion amount between two images whose focus positions are different by one stage as a function of the distance D.

Subsequently, the all-in-focus image is generated by a correction and an image synthesis based on the obtained correlation (Step S205). The correction principle is as described above. It is sufficient to correct the image distortion in the comparison between the pixels at the time of the image synthesis and it is not always necessary to generate a corrected image for each image. Specifically, a specific mode of the image synthesis may be either a method for synthesis after the individual images are corrected or a method for applying the correction in finding out corresponding pixels between the images.

Note that the method for generating an all-in-focus image is not particularly limited, but it is desirable to synthesize images not merely by superimposition but, for example, by weighted addition of giving a larger weight to a clearer image. For example, all-in-focus image synthesis methods described in JP 2018-042006A and JP 2018-046475A previously disclosed by the applicant of this application are suitably applicable for this purpose.

At this time, deformations and positional deviations of objects between the images are solved by correcting image distortions due to the meniscus. Thus, it is possible to generate an all-in-focus image with excellent image quality by suppressing ghost-like shadows and image distortions created in a synthesized image due to positional deviations.

The generated image is output in an appropriate mode (Step S206). For example, the generated image may be output to and displayed on the display 148 or may be output to an external display apparatus or printing apparatus. Further, image data corresponding to the generated image may be transmitted to an external apparatus or may be written in an external storage medium.

Figure 9:
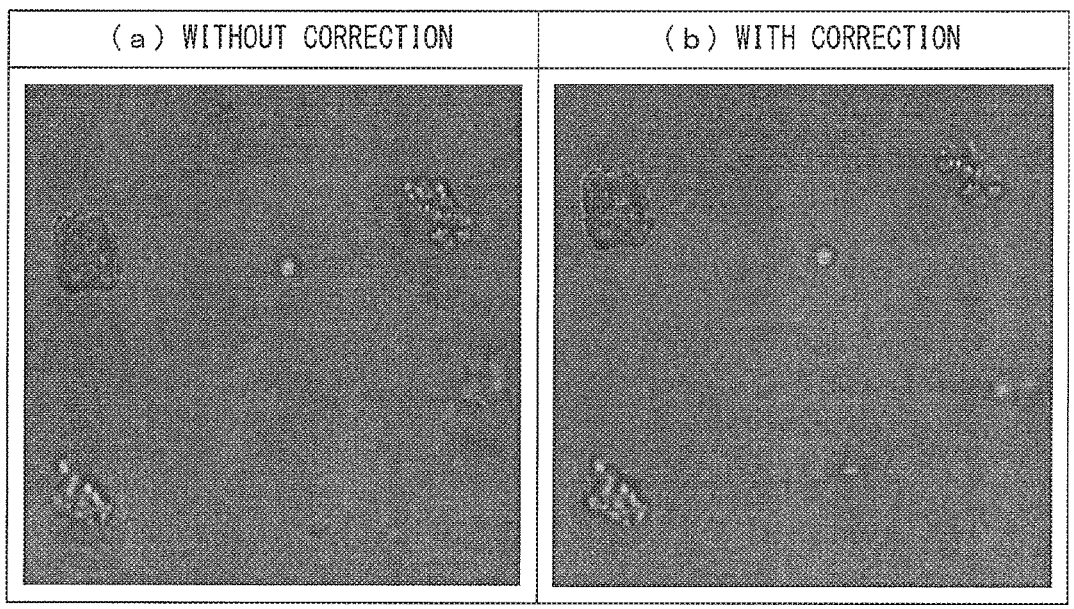
FIG. 9 is a diagram showing examples of generating an all-in-focus image from a plurality of images.

FIG. 9 is a diagram showing examples of generating an all-in-focus image from a plurality of images. Column (a) of FIG. 9 shows an example of a synthesized image without performing a distortion correction, and column (b) of FIG. 9 shows an example of synthesized image by performing the distortion correction. In an image shown in column (a) of FIG. 9, ghost-like or shadowy unclear images appear around objects corresponding to cell colonies, particularly in the vertical direction of the image. These are caused by positional deviations of the objects between the images due to the image distortion. On the other hand, in an image shown in column (b) of FIG. 9, no such unclear image appears and only clear images of the cell colonies are obtained. It is found from this that the image processing of this embodiment has an effect of suppressing a reduction of the image quality of the all-in-focus image by the image distortion created by different focus positions.

The above description is given on the premise that one well 91 is entirely covered by one imaging. However, such as when the well 91 has a large diameter or when an imaging magnification is increased, the well 91 may not be possibly entirely covered by one imaging. In such a case, a large image of the entire well 91 is also generated by dividing the entire well 91 into a plurality of imaging fields of view, imaging each imaging field of view, and joining images obtained by each imaging (tiling). The image processing described above effectively functions also in such a case. However, the imaging operation needs to be modified as described below.

Figure 10:
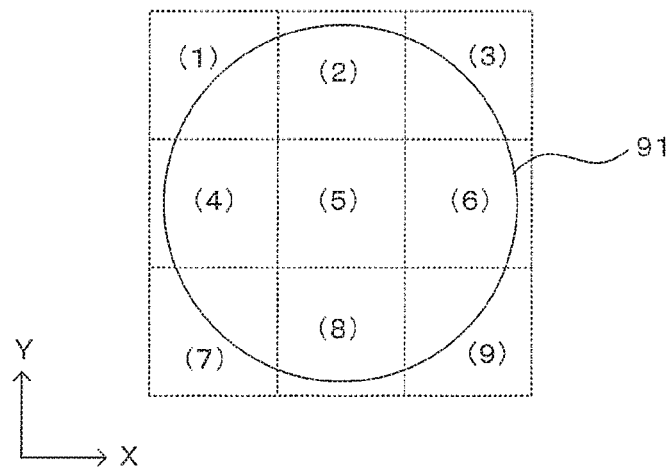
FIG. 10 is a diagram schematically showing a modification of the imaging operation.
Figure 11:
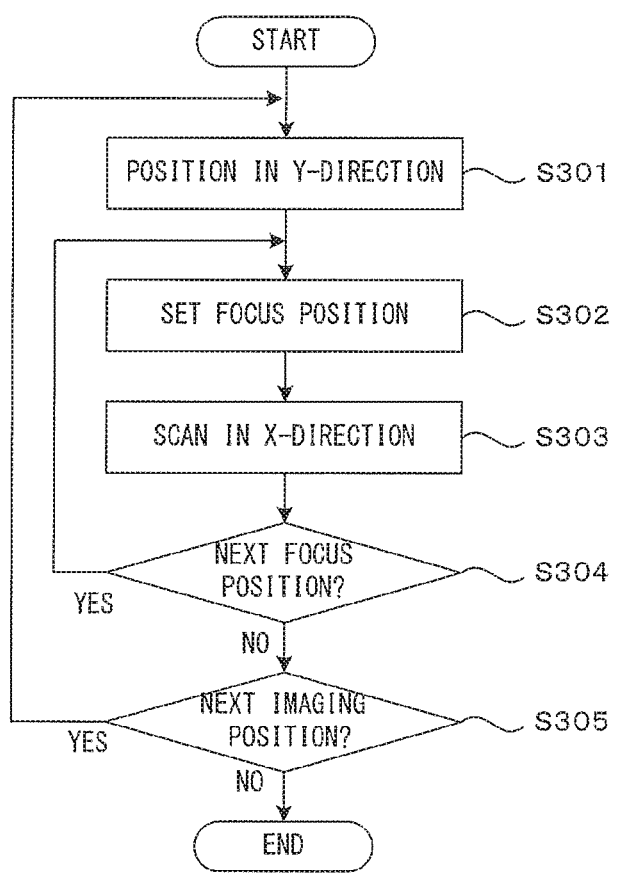
FIG. 11 is a flow chart showing the modified imaging operation.

FIG. 10 is a diagram schematically showing a modification of the imaging operation, and FIG. 11 is a flow chart showing the modified imaging operation. As shown by dotted-line squares in FIG. 10, to image the entire well 91 under a condition that an imaging field of view is smaller than a planar size of the well 91, the well 91 is divided into a plurality of imaging regions (3×3 blocks in this example), and each imaging region is individually imaged. Each block is denoted by a unique number (1) to (9) to distinguish the image region of each block in FIG. 10.

Each of these blocks can be imaged, for example, in the following procedure. First, imaging is performed a plurality of number of times for the blocks (1), (2) and (3) with a focus position changed. Subsequently, imaging is performed a plurality of number of times for the blocks (4), (5) and (6) with the focus position changed. Finally, imaging is performed a plurality of number of times for the blocks (7), (8) and (9) with the focus position changed. Although the imaging regions are simply divided by dotted lines in FIG. 10, the imaging regions are actually so set that end parts between adjacent imaging regions slightly overlap to prevent the images from being missed. By joining the images of the respective imaging regions individually imaged in this way, an image corresponding to the entire well 91 can be obtained.

The imaging operation in this case is as follows. Specifically, as shown in FIG. 11, the imager 13 is set at a predetermined position in a Y direction by the driving mechanism 15 (Step S301). More specifically, the imager 13 is positioned at the position in the Y direction to image the blocks (1) to (3). Further, the focus position is set at an initial position (Step S302). In this state, the imager 13 is moved to scan in an X direction by the driving mechanism 15 (Step S303) and the imager 13 performs imaging a plurality of number of times, whereby images of the blocks (1) to (3) are obtained. By repeating the above operation while changing the focus position (YES in Step S304), a plurality of images having different focus positions are obtained for the respective blocks (1) to (3).

After imaging is completed for all the focus positions (NO in Step S304), the processings of Steps S301 to S304 are repeated if there is the next imaging position in the Y direction (YES in Step S305). In this way, a plurality of images having different focus positions are obtained for the respective blocks (4) to (6) and (7) to (9).

Contents of the image processing operation in this case are basically the same as those in FIG. 7. However, the plurality of images having different imaging positions in the horizontal direction need to be finally joined. There are two ways of thinking for a combination of this and the image synthesis for generating an all-in-focus image. The first way of thinking is a method for forming one image by joining a plurality of images imaged at the same focus position and generating an all-in-focus image by synthesizing the images joined for each focus position. The second way of thinking is a method for first generating an all-in-focus image between images imaged with the focus position changed at the same imaging position and joining the generated all-in-focus images in the horizontal direction.

The first method is excellent in image continuity after joining and advantageous in terms of the stability of image quality since unprocessed images are joined. Hence, the data size of the joined image becomes large and large memory resources are consumed in later calculation and data storage.

On the other hand, the second method is disadvantageous in continuity since the individually generated all-in-focus images are joined, but advantageous in that the data size is smaller and a calculation load and the consumption of memory resources are reduced. Further, the second method is advantageous also in that a processing time can be shortened as compared to the first method. The reason is as follows. In the first method, a process of generating the all-in-focus image is enabled after imaging at each focus position is completed for all the blocks (1) to (9). On the contrary, after imaging is finished for the blocks (1) to (3), a process of generating the all-in-focus image for the blocks (1) to (3) can be performed concurrently with the imaging of the blocks (4) to (6) with the second method. Similarly, a process of generating the all-in-focus image for the blocks (4) to (6) can be performed during the imaging of the blocks (7) to (9). In this way, the processing time from the start of imaging to the generation of the all-in-focus image is shortened.

Note that since the images of parts of the well 91 are processed in the process of generating the all-in-focus image by the second method, the well center Cw may not be included in some images. Even in such cases, the correction process is performed based on the virtually specified position of the well center Cw outside of the image.

Figure 12:
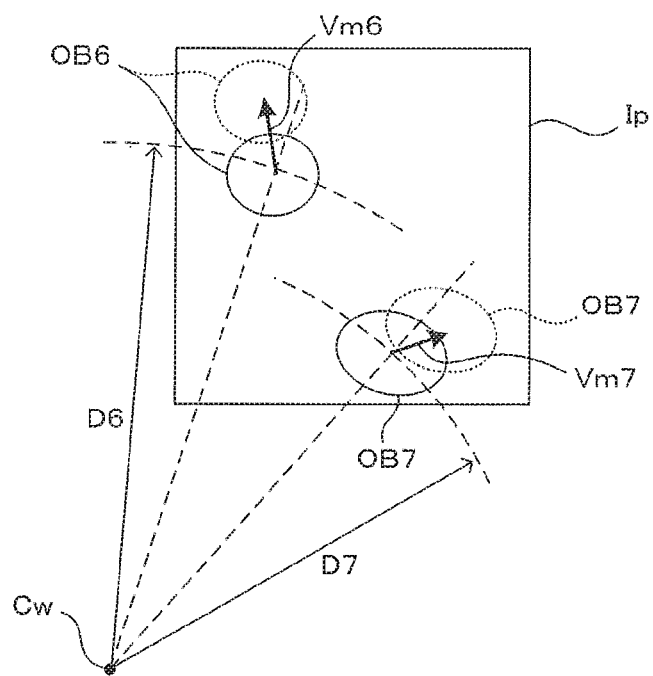
FIG. 12 is a diagram showing the principle of a distortion correction when a well center is not included in an image.

FIG. 12 is a diagram showing the principle of a distortion correction when a well center is not included in an image. In the case where any one of the images obtained by imaging the blocks (1) to (9) is set as an image Ip to be processed, it is assumed that a motion vector Vm6 is recognized for one object OB6 and a motion vector Vm7 is recognized for another object OB7. At this time, a displacement amount of the object OB6 is associated with a distance D6 from a well center Cw virtually set outside the image. A correction for the object OB6 is also performed along a direction toward the virtual well center Cw. The same also applied to the object OB7, a displacement amount is associated with a distance D7 from the well center Cw outside the image, and a correction is performed along a direction toward the well center Cw. The position of the well center Cw viewed from the image Ip can be estimated from a mechanical relative positional relationship between the well 91 during imaging and the imager 13 in the horizontal direction.

By individually performing the distortion correction for each imaging position, the following advantage unobtainable by the first method is also created. The distortion correction of this embodiment mainly supposes the correction of an image distortion due to the meniscus and assumes that the distortion isotropically appears with respect to a rotating direction about the well center Cw. However, a distortion of the imaging optical system and a distortion due to illumination and liquid surface disturbance are also locally applied to an actual image. Therefore, there is a limit to correction accuracy for such local distortions with the correction based on isotropic assumption. With the first method for correction after the images are joined, this limit cannot be exceeded since one correction rule is applied to the entire image.

In contrast, in the second method for individual correction in each imaging region, an individual rule is derived and applied to each imaging region. Specifically, the correlation between the distance D from the well center Cw and the displacement amount L is independently obtained for each imaging region. Thus, the imaging region including a local distortion is corrected by a correction rule reflecting a displacement by that local distortion. On the other hand, the imaging region including no local distortion is so corrected as not to be affected by local distortions included in the other imaging regions. Therefore, the correction can be performed with higher accuracy than the first method for the individual imaging regions, with the result that the quality of the distortion correction can be improved for the entire well 91.

Figure 13:
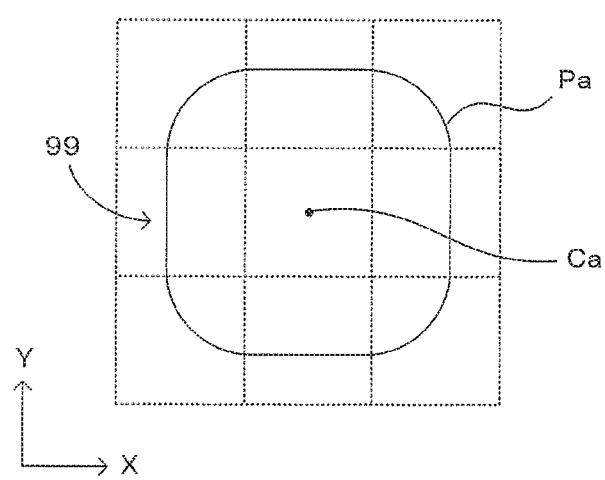
FIG. 13 is a diagram showing an example of a well having a noncircular cross-section.

FIG. 13 is a diagram showing an example of a well having a noncircular cross-section. Besides the container including the wells 91 having a circular cross-section as described above, containers including wells having a rounded rectangular cross-section, i.e. having a square cross-section with rounded vertices as shown in FIG. 13 are also widely used as containers provided with wells for culturing cells. In the case of applying the image processing of this embodiment to an image of such a well 99, a distance from a well center Ca to a peripheral edge part Pa is not constant. Hence, a magnitude of distortion due to the meniscus is also not uniform with respect to the distance from the well center Ca. Thus, it is difficult to uniquely obtain a correlation between the distance from the well center Ca and a displacement amount.

In such a case, the well 99 may be imaged while being divided into a plurality of imaging regions as shown by dotted lines in FIG. 13, and the distortion may be corrected for each imaging region. By doing so, the peripheral edge part of the well 99 can be regarded as a part of an arc in the individual imaging regions although being roughly approximated. Thus, the aforementioned distortion correction accuracy can be improved as compared to the case where the entire well is one imaging region.

Note that the invention is not limited to the above embodiment and various changes other than the aforementioned ones can be made without departing from the gist of the invention. For example, in the above embodiment, it is assumed that the imaging optical system is a telecentric optical system and an image magnification is not changed by a change of the focus position. On the other hand, in the case of using a non-telecentric optical system, an image magnification also changes as a focus position changes. In this case, since a change amount of the magnification caused by the change of the focus position should be known in advance, the magnification is desirably corrected prior to calculation between images having different focus positions.

Further, an image magnification may vary depending on an imaging position due to a mechanical structure in the case of dividing a well into a plurality of imaging regions and imaging each imaging region. A process for correcting the image magnification may be separately performed before the distortion correction of this embodiment.

Further, in the above embodiment, the change amount per stage in changing and setting the focus position is constant. Thus, a scale of the local movement amount obtained from a combination of images having focus positions closest to each other is the same among any combinations. On the other hand, if the change amount of the focus position is not constant, it is desirable to normalize a magnitude of the obtained local movement amount by the change amount of the focus position.

Further, in the above embodiment, the local movement amount is calculated for the imaged image itself. However, the local movement amount may be obtained after the image is appropriately compressed unless accuracy is affected in calculating the correlation between the distance from the well center and the displacement amount such as when many objects are included in an image. By doing so, it is possible to reduce a calculation amount and speed up the process. Further, the image may be smoothed by an appropriate filtering process.

Further, the above embodiment has been described on the premise that the meniscus created on the liquid surface in the well functions as a concave lens having a downward convex shape. However, wells having water-repellent inner wall surfaces are also used for a particular application, and the invention is effective also in imaging a specimen prepared using such a well. In this case, a liquid surface is convex upward and functions as a convex lens. Thus, each object in an image is distorted toward a well center side.

Even in such a case, each pixel of the image is corrected in a direction away from the well center based on a correlation between a distance from the well center and a distortion amount obtained as in the above embodiment. the influence of distortion caused by a lens effect of the meniscus can be eliminated By performing an image synthesis associated with such a distortion correction, it is possible to obtain an all-in-focus image with good image quality as in the above embodiment.

As the specific embodiment has been illustrated and described above, a correction in the invention for one pixel of one of the images may be executed by placing a pixel having a pixel value of the one pixel to a position at which the image distortion amount specified by the distance of the one pixel and the correlation is cancelled. Further, the correction for one pixel of one of the images may be executed by displacing the one pixel toward a center of the well by a distance corresponding to the image distortion amount specified by the distance of the one pixel and the correlation. Furthermore, the correction for one pixel of one of the images may be executed by displacing the one pixel in a direction away from a center of the well by a distance corresponding to the image distortion amount specified by the distance of the one pixel and the correlation. According to such a configuration, the correction is equivalent to a movement of the pixel to cancel out a displacement caused by a distortion of an image, wherefore the distortion can be accurately corrected.

Further, the plurality of images may be obtained by changing and setting the focus position at a plurality of stages and performing imaging, and the local movement amount may be calculated between two images whose focus positions are different by one stage. According to such a configuration, a probability that the same object commonly appears in two images having slightly different focus positions is high, wherefore many corresponding locations can be found out between the both images and a multitude of samples of the local movement amount can be prepared.

Further, an entirety of the well may be divided into a plurality of imaging fields of view, the plurality of images may be captured for respective imaging fields of view, the all-in-focus image may be generated for each imaging field of view, and the all-in-focus image corresponding to the entirety of the well may be generated by joining the all-in-focus images corresponding to the plurality of respective imaging fields of view. According to such a configuration, even if the entire well cannot be captured in an imaging field of view by one imaging such as when the well has a large diameter or when an imaging magnification is high, an image of the entire well can be obtained if images imaged in a divided manner are joined ex post facto.

In this case, images can be obtained for other imaging fields of view while an all-in-focus image is generated for the imaging fields of view for which a plurality of images were already obtained. According to such a configuration, a processing time from the start of imaging to the generation of an all-in-focus image can be shortened by concurrently performing imaging in some imaging fields of view and an image processing in the other imaging fields of view.

Further, the correlation can be expressed by a polynomial using the distance as a variable. According to such a configuration, a correlation relationship between a distance and a movement amount can be easily specified by applying a calculated movement amount of each characteristic point, for example, to a known least squares method.

This invention can generate an all-in-focus image of cells, cell colonies and the like distributed at various depths in a liquid with satisfactory image quality and is suitably applicable in the fields of medicine and biochemistry such as drug discover screening.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

What is claimed is:

1. An image processing method, comprising:
   obtaining a plurality of images captured by imaging an imaging object carried together with a liquid in a well with a focus position changed in a direction substantially perpendicular to a liquid surface;
   calculating a local movement amount between the plurality of images;
   determining a correlation between a distance from a center of the well and an image distortion amount based on the local movement amount; and
   synthesizing the plurality of images by correcting pixels in each image based on the correlation and generating an all-in-focus image.

2. The image processing method according to claim 1, wherein a correction for one pixel of one of the images is executed by placing a pixel having a pixel value of the one pixel to a position at which the image distortion amount specified by the distance of the one pixel and the correlation is cancelled.

3. The image processing method according to claim 1, wherein a correction for one pixel of one of the images is executed by displacing the one pixel toward a center of the well by a distance corresponding to the image distortion amount specified by the distance of the one pixel and the correlation.

4. The image processing method according to claim 1, wherein a correction for one pixel of one of the images is executed by displacing the one pixel in a direction away from a center of the well by a distance corresponding to the image distortion amount specified by the distance of the one pixel and the correlation.

5. The image processing method according to claim 1, wherein
   the plurality of images are obtained by changing and setting the focus position at a plurality of stages and performing imaging, and
   the local movement amount is calculated between two images whose focus positions are different by one stage.

6. The image processing method according to claim 1, wherein
   an entirety of the well is divided into a plurality of imaging fields of view,
   the plurality of images are captured for respective imaging fields of view,
   the all-in-focus image is generated for each imaging field of view, and
   the all-in-focus image corresponding to the entirety of the well is generated by joining the all-in-focus images corresponding to the plurality of respective imaging fields of view.

7. The image processing method according to claim 6, wherein images are captured for other imaging fields of view while the all-in-focus image is generated for the imaging field of view for which a plurality of images were already captured.

8. The image processing method according to claim 1, wherein the correlation is expressed by a polynomial using the distance as a variable.

9. The image processing method according to claim 1, wherein a horizontal cross-section of the well has a circular shape.

10. An image processing apparatus, comprising:
    an imager which captures a plurality of images by imaging an imaging object carried together with a liquid in a well with a focus position changed in a direction substantially perpendicular to a liquid surface; and
    an image processor which generates an all-in-focus image by synthesizing the plurality of images, wherein
    the image processor determines a correlation between a distance from a center of the well and an image distortion amount based on a local movement amount calculated between the plurality of images and synthesizes the plurality of images by correcting pixels in each image based on the correlation.

11. The image processing apparatus according to claim 10, wherein
    the imager images an entirety of the well by dividing the well into a plurality of imaging fields of view and capturing the plurality of images for respective imaging fields of view,
    the image processor generates the all-in-focus image for each imaging field of view, and
    the image processor generates the all-in-focus image for the imaging field of view for which a plurality of images were already captured while the imager captures the image for other imaging fields of view.

\* \* \* \* \*